US008213371B1

(12) United States Patent
Prock et al.

(10) Patent No.: US 8,213,371 B1
(45) Date of Patent: Jul. 3, 2012

(54) USING A SYNCHRONIZED ACCESS CHANNEL TO TRACK A MOBILE DEVICE

(75) Inventors: John William Prock, Peculiar, MO (US); Bhagwan Singh Khanka, Lenexa, KS (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 639 days.

(21) Appl. No.: 12/407,582

(22) Filed: Mar. 19, 2009

(51) Int. Cl.
*H04W 4/00* (2009.01)
(52) U.S. Cl. .......................... 370/329; 370/338; 370/341
(58) Field of Classification Search .................. None
See application file for complete search history.

(56) References Cited

U.S. PATENT DOCUMENTS

| | | | |
|---|---|---|---|
| 7,430,191 B2 * | 9/2008 | Subrahmanya et al. | 370/335 |
| 7,492,699 B2 * | 2/2009 | Cho | 370/203 |
| 7,660,590 B2 * | 2/2010 | Timiri et al. | 455/456.3 |
| 2003/0227913 A1 * | 12/2003 | Hallman et al. | 370/374 |
| 2007/0159994 A1 * | 7/2007 | Brown et al. | 370/324 |
| 2008/0062913 A1 * | 3/2008 | Zander et al. | 370/320 |
| 2008/0117862 A1 * | 5/2008 | Yeshayahu et al. | 370/328 |
| 2008/0207230 A1 * | 8/2008 | Jung et al. | 455/458 |

* cited by examiner

*Primary Examiner* — Chi Pham
*Assistant Examiner* — Soon-Dong Hyun

(57) ABSTRACT

An embodiment of the current invention is directed to reducing the time for a computing device to deliver a message to a mobile computing device. A request to enter a tracking mode is received on a quick paging channel. A transition to a tracking mode is performed. Via a slotted access channel, a location-change message is sent that indicates that the mobile computing device has entered a new location. The location-change message is sent when the mobile computing device changes locations.

20 Claims, 9 Drawing Sheets

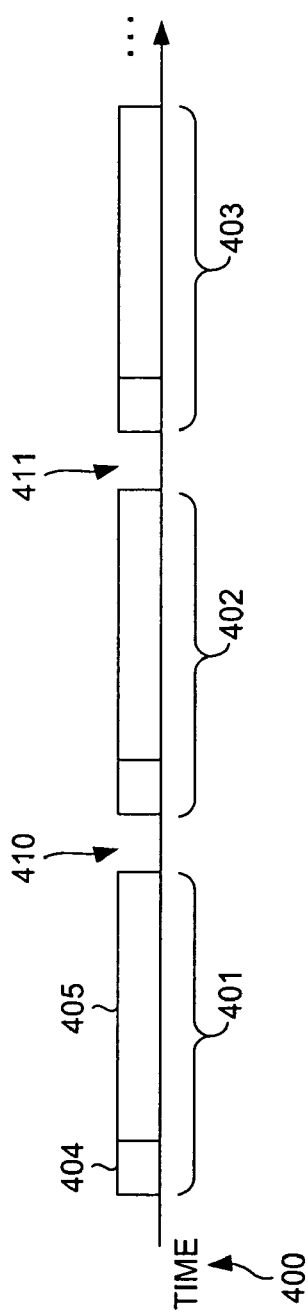
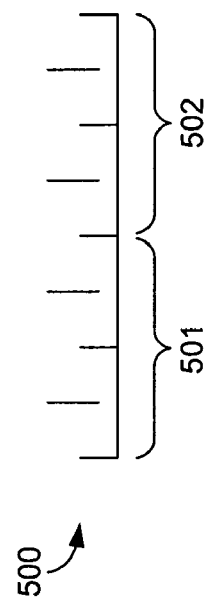

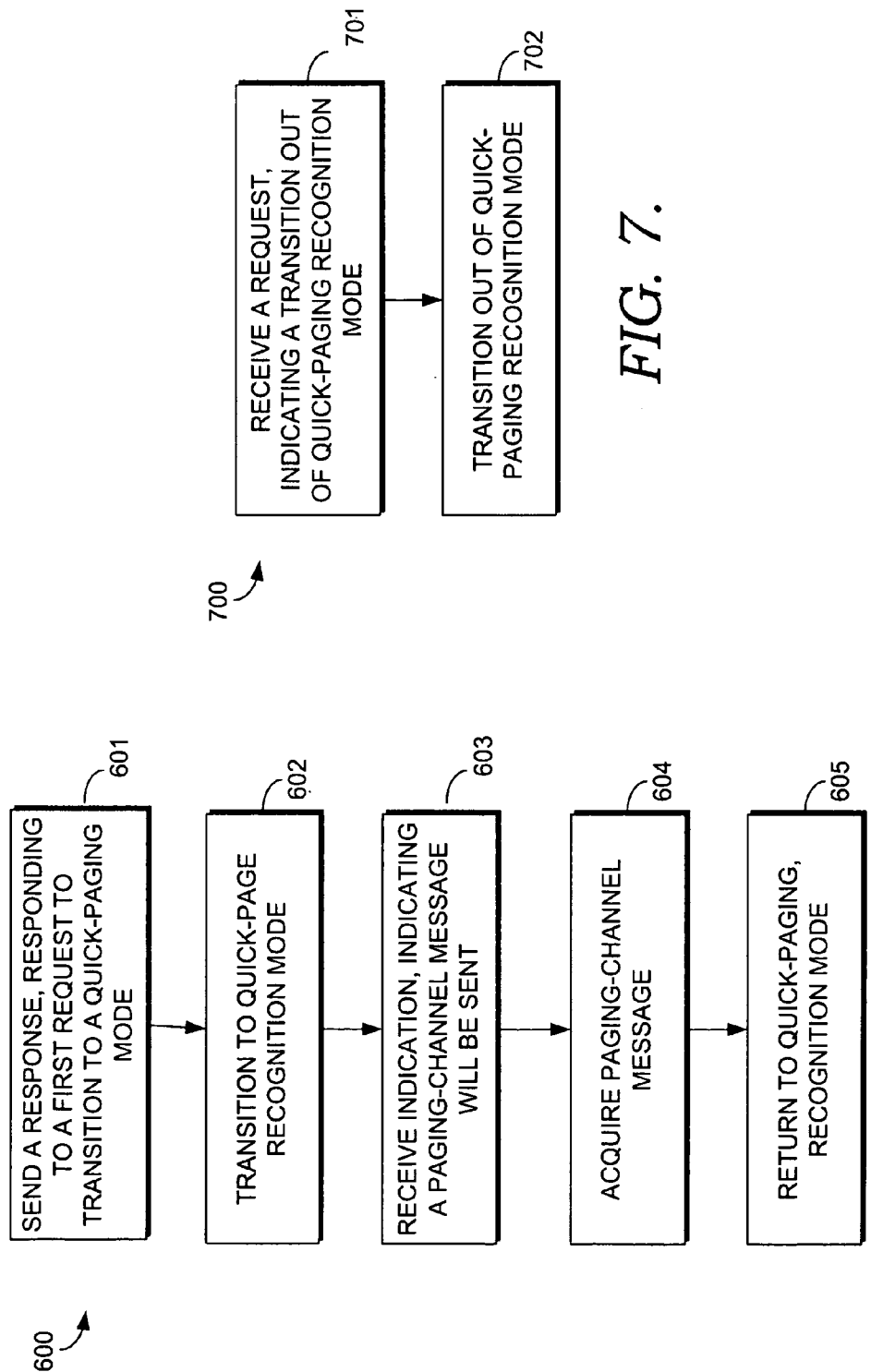

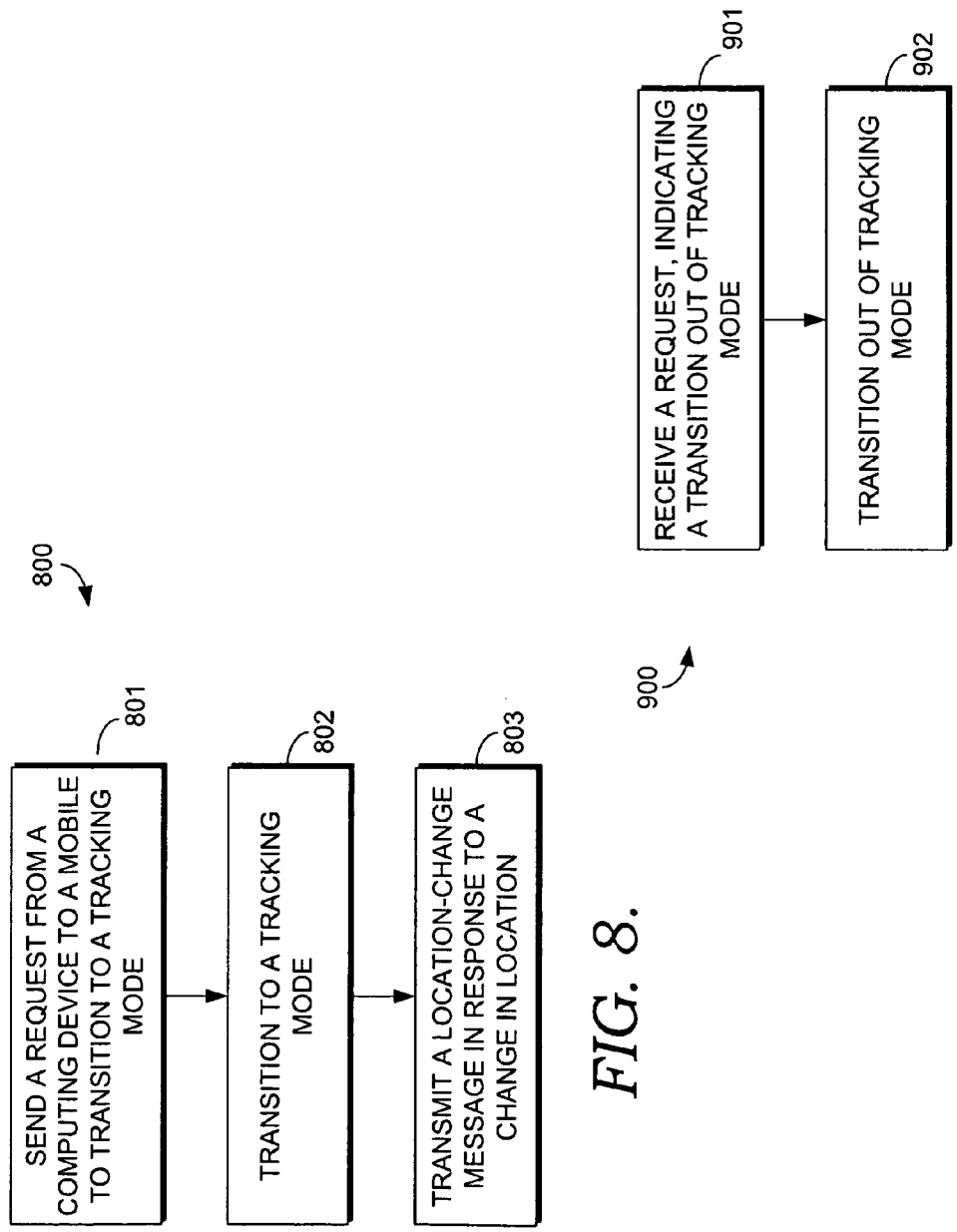

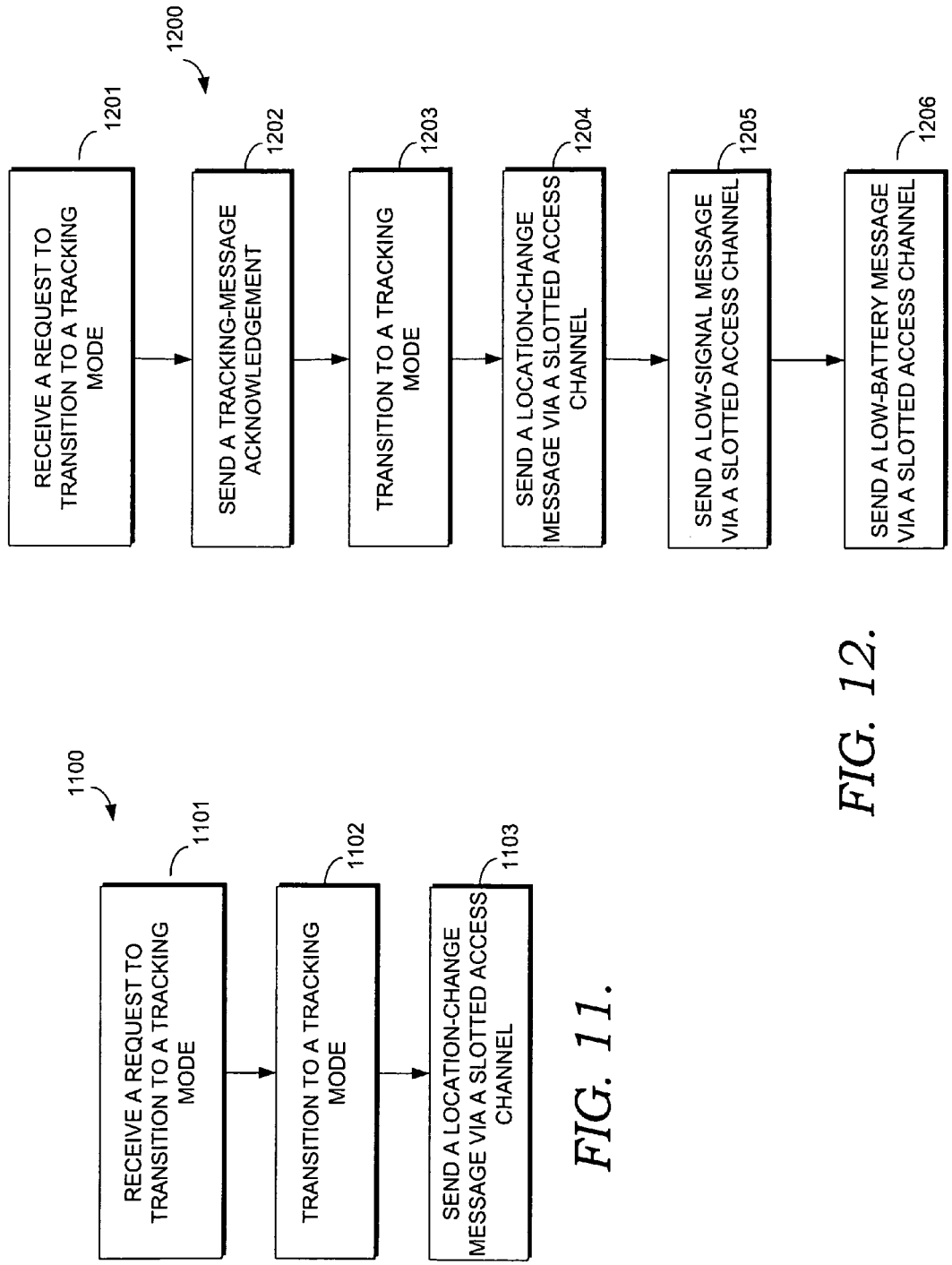

USING A SYNCHRONIZED ACCESS CHANNEL TO TRACK A MOBILE DEVICE

CROSS REFERENCE TO RELATED APPLICATIONS

This application is related by subject matter to the copending application filed on even date herewith, entitled REDUCING COMMUNICATION LATENCY BY UTILIZING A QUICK-PAGING CHANNEL, having client Ser. No. 12/407,563, (and which is incorporated by reference herein).

SUMMARY

Embodiments of the invention are defined by the claims below, not this summary. A high-level overview of various aspects of the invention is provided here for that reason, to provide an overview of the disclosure, and to introduce a selection of concepts that are further described below. This summary is not intended to identify key features or essential features of the claimed subject matter, nor is it intended to be used as an aid in isolation to determine the scope of the claimed subject matter.

Embodiments of the present invention are related to reducing the time for a computing device to deliver a message to a mobile computing device. A request to enter a tracking mode is received on a quick paging channel. A transition to a tracking mode is performed. Via a slotted access channel, a location-change message is sent that indicates that the mobile computing device has entered a new location. The location-change message is sent when the mobile computing device changes locations.

BRIEF DESCRIPTION OF THE DRAWINGS

Illustrative embodiments of the present invention are described in detail below with reference to the attached drawing figures, and wherein:

FIG. 4 is a timing diagram for a slotted protocol;

FIG. 5 is a diagram depicting a message format;

FIG. 6 is a flow diagram showing a method of locating a mobile computing device, in accordance with an embodiment of the present invention;

FIG. 7 is a flow diagram showing a method of exiting a quick-paging mode, in accordance with an embodiment of the present invention;

FIG. 8 is a flow diagram showing a method of locating a mobile computing device, in accordance with an embodiment of the present invention;

FIG. 9 depicts a block diagram of a process for exiting a tracking mode, in accordance with an embodiment of the present invention;

FIG. 11 is a follow diagram showing a method of reducing the time for a computing device to deliver a message to a mobile computing device, in accordance with an embodiment of the present invention;

FIG. 12 is a follow diagram showing a method of reducing the time for a computing device to deliver a message to a mobile computing device, in accordance with an embodiment of the present invention.

DETAILED DESCRIPTION

Figure 1:
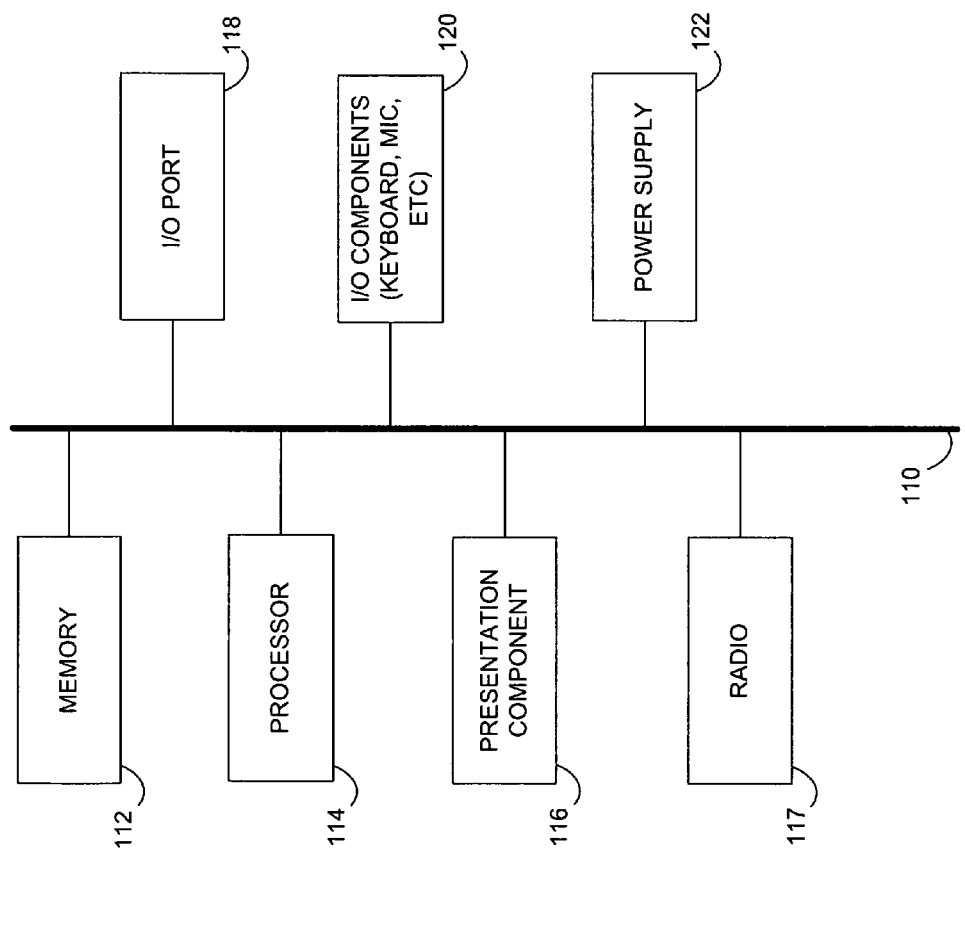
FIG. 1 depicts a block diagram of an exemplary computing environment suitable for implementing an embodiment of the invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to locating a mobile computing device utilizing a quick-paging channel. Mobile computing devices (e.g., mobile phones and mobile personal digital assistants (PDAs)) use network resources to access data on remote computing devices and facilitate voice calls and text messaging. Such devices can use base stations placed throughout the environment as points of connection to various networks. These networks can provide access to desired resources and support communication between multiple devices. When a mobile computing device is idle (i.e., not currently involved in any communication) there is the potential that the mobile computing device could move away from the base station it last used for communication. A mobile computing device location mechanism could be used to find the new point of attachment of the mobile communication device in the case that a separate mobile device is attempting to initiate a communication session with the newly moved mobile communication device.

Mobile computing devices can use a paging channel and an access channel to receive and respond to short messages (e.g., Short Message Service (SMS) messages), thereby allowing base stations to locate the point of attachment of the mobile computing device. Paging channels and access channels can be configured in a number of ways. For example, each mobile computing device could be allocated a slot of time during which the associated mobile device should listen to the paging channel. Mobile computing devices could also be allocated a slot of time on the access channel during which they can transmit messages. Paging-channel messages can be long enough to contain various information (e.g. text messages). There can be a tradeoff between the time at which a page is received from the time it is sent and the amount of time a mobile computing device must listen to the paging channel. If there is more time between the slots of time associated with a particular mobile computing device, then that mobile computing device can turn off its radio for longer periods of time, conserving energy. Longer times during which the radio is off increase the time needed to receive a page.

One mechanism by which a mobile computing device could be located in a network of base stations is to send a page out from all base stations in the network and wait for a response from the mobile computing device, thereby learning which base station is providing a connection to the network.

Each page sent out from base stations not being used by the mobile computing device can constitute wasted resources (e.g., in terms of energy and bandwidth). Additionally, the mobile device must decode an entire page message, which may be hundreds of bytes long, consuming energy on the mobile computing device. According to an embodiment, the location of a mobile device could be a geographical location. According to a further embodiment, the location could be a base station serving as a point of network attachment for the mobile device.

According to an embodiment of the invention, a quick-paging recognition mode could be used to inform a mobile computing device that it should listen to a paging channel to receive a page. The quick-paging recognition mode could be dynamically turned on and off for each of the mobile computing devices in the network, allowing the optimization of resource utilization (e.g., using quick-paging to allow a subset of the mobile computing devices to be rapidly located). The quick-paging recognition mode, when activated, could notify the mobile computing devices to only listen to a small message during its assigned time slot, allowing the mobile device to be in idle for a greater proportion of time. At the same time, the quick-paging mode could be used to page the mobile computing device with a very short message, allowing the mobile computing device to be located while minimizing energy consumption.

According to a further embodiment, the quick-paging mode could be used to turn on a tracking mode. The tracking mode could use the same small messages during a mobile computing device's assigned time slot on an access channel to send location-change information, proactively updating the mobile computing device's location in the network. Such a tracking mode could also be dynamically turned on and off, allowing optimizations to be performed, choosing which subset of nodes would be tracked more closely than others. Additionally, a mobile computing device could send a message on the access channel indicating that it was experiencing low signal quality. This could be used by the base station to adjust the paging rate used to contact the mobile computing device. A mobile computing device could send a message on the access channel indicating a low remaining battery capacity. Such messages could also be used by the base stations or other computing devices connected to the network to adjust paging message schemes to locate the mobile computing device.

An embodiment of the invention is directed to a method of reducing the latency associated with communicating data to a mobile device. It is determined that a threshold period of time has elapsed since a mobile device has communicated a location-determining message. A request for the mobile device to transition to a quick-paging recognition mode is sent to a mobile device configured to perform a process. The process includes: sending a response to the first request as a location-determining message; transitioning to a quick-page recognition mode; receiving an indication to receive a paging-channel message; acquiring the paging-channel message; and returning to the quick-page recognition mode.

Another embodiment of the invention is directed to a method of locating a mobile computing device utilizing a quick-paging channel. A request is sent for a computing device attached to a network of base stations to a mobile device. The request indicates that the mobile device transition to a tracking mode. The mobile device is configured to perform a process including: transitioning to the tracking mode; and transmitting a location-change message in response to a change in location.

A further embodiment of the invention is directed to a method of locating a mobile computing device utilizing a quick-paging channel. A first four-bit indication is received over a channel utilizing a slotted protocol, indicating a transition to a quick-paging recognition mode. A transition to a quick-paging recognition mode occurs. A second four-bit message is received over a channel utilizing a slotted protocol, indicating a paging-channel message will be sent. The paging-channel message is acquired by listening to a paging channel. A return to the quick-paging mode occurs.

Another embodiment of the invention is directed to a method of reducing the time for a computing device to deliver a message to a mobile computing device. A request to enter a tracking mode is received on a quick paging channel. A transition to a tracking mode is performed. Via a slotted access channel, a location-change message is sent that indicates that the mobile computing device has entered a new location. The location-change message is sent when the mobile computing device changes locations.

Another embodiment of the invention is directed to a method of reducing the time for a computing device to deliver a message to a mobile computing device. A request to enter a tracking mode is received on a quick paging channel. Via a slotted access channel, a tracking-message acknowledgement is sent. The mobile computing device is assigned a slot on the slotted access channel. A transition to a tracking mode is performed. Via a slotted access channel, a location-change message is sent that indicates that the mobile computing device has entered a new location. The location-change message is sent when the mobile computing device enters a new location. Via the slotted access channel, a low-signal message is sent that indicates that the mobile computing device detects a poor signal quality. The low-signal message is sent when the mobile computing device detects a poor signal quality. Via the slotted access channel, a low-battery message is sent that indicates that the mobile computing device detects a low remaining battery capacity. The low-battery message is sent when the mobile computing device detects a low remaining battery capacity.

A further embodiment of the invention is directed to a method of reducing the time to deliver a message to a mobile computing device. The mobile computing device is assigned a slot on a slotted access channel by a computing device, each slot on the access channel being dynamically assigned based on a mobile identifier, identifying an associated mobile computing device. A tracking-mode-activation message is sent from the computing device to the mobile computing device, responsive to a threshold period of time elapsing since the mobile computing device has communicated with a base station. The mobile computing device is configured to perform a process incident to receiving the message. The process includes: transitioning to a tracking mode; and via a slotted access channel, sending a location-change message that indicates that the mobile computing device has entered a new location. The location-change message is sent when the mobile computing device enters a new location.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
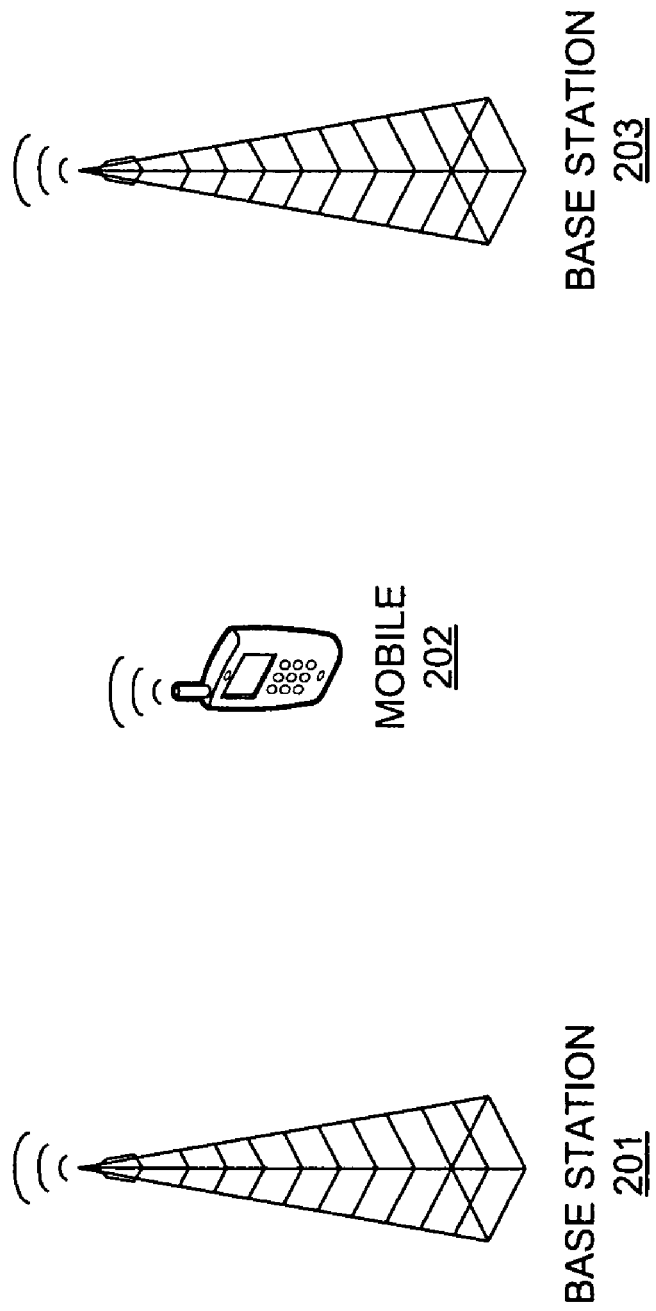
FIG. 2 depicts a block diagram of an exemplary network environment suitable for implementing an embodiment of the invention.

Turning now to FIG. 2, a diagram depicting a network environment suitable for implementing the present invention is given. Each mobile computing device 202 can utilize base stations (e.g., base station 201 and base station 203) to connect to a wide-area network, such as the Internet, or a voice network. Base stations 201 and 203 can be operable to connect various mobile computing devices to network resources through various wireless technologies. For example, CDMA, $3^{rd}$ generation (3G), and WiMAX are examples of wireless technologies suitable for use by base stations 201 and 203. The term base station can broadly be used to indicate a point of attachment to the network.

Figure 3:
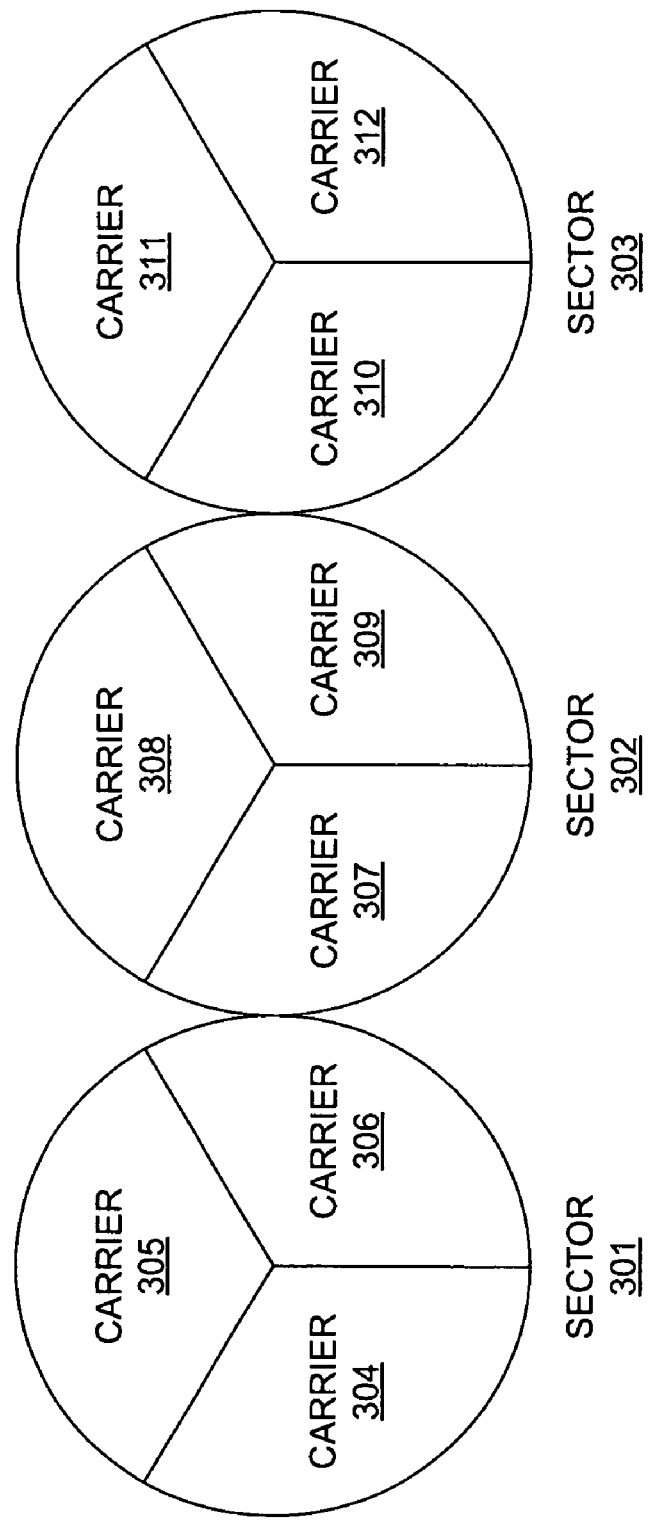
FIG. 3 depicts a block diagram of an exemplary wide-area network environment suitable for implementing an embodiment of the invention.

Networks created by groups of base stations can be logically divided into various regions. Turning to FIG. 3, a wide-area network can be divided into various sectors 301, 302, and 303. Each sector can further be divided into carriers. For example, sector 301 could be divided into carriers 304, 305, and 306, sector 302 could be divided into carriers 307, 308, and 309, and sector 303 could be divided into carriers 310, 311, and 312. Those skilled in the art will recognize that there are many possible ways a network could be divided into sectors and carriers. As mobile computing devices switch between sectors and carriers, it may be desirable to track which carrier or sector would be used by the mobile device to communicate. When the mobile computing device is idle and in motion, a quick-paging channel could be used to locate the device. According to another embodiment of the invention, a tracking mode could be used to locate the device.

According to some embodiments of the invention, a slotted protocol could be used to transmit quick-paging messages, indicating various state changes in the mobile computing device. Additionally, a slotted access channel could be used to transmit messages from a mobile computing device to other devices on the network, including base stations. A slotted protocol can divide time into a number of slots and then assign various mobile computing devices to each time slot. According to some embodiments of the invention, mobile devices can be dynamically assigned to slots to support communication as mobile devices enter and exit the coverage area of a base station. For example, a mobile identifier associated with a mobile computing device could be used to assign a mobile device to a slot. Referring to FIG. 4, a timing diagram, depicting a slotted protocol is given. Time can be divided into a number of primary slots 401, 402, and 403. By way of example, time could be divided into 2,400 four-bit slots every second. There are many other possible division that could be used for a slotted channel. These slots can be separated by guard times 410 and 411. Guard times can be used to minimize the chance that messages will be incorrectly deciphered, for example, due to clock skew. Each primary time slot could be assigned to one or more mobile computing devices. If more than one mobile computing device is associated with each slot, then a mechanism to negotiate transmission rights could be used. By way of example a voting mechanism could be used. Those skilled in the art will recognize that there are a number of ways to design and use a slotted protocol. The primary slots could be further divided. For example, primary slot 401 could be divided into a paging channel segment 405 and a quick-paging channel segment 404.

According to an embodiment of the invention, a mobile computing device that is in quick-paging recognition mode only needs to turn its radio on during its assigned quick-paging channel segment. For example, if a mobile computing device is assigned slot 401 and is in quick-paging recognition mode, then its radio can be turned on during time segment 404. If that same mobile device was not in quick-paging recognition mode, it would have its radio turned on for all of time segment 401.

Small messages fit in the quick-paging channel. By way of example, a two-bit message could be used to send commands to a mobile computing device. According to an embodiment of the invention, 00 could be used to tell a mobile computing device to leave quick-paging recognition mode, and 11 could be used to indicate a mobile computing device should enter quick-paging recognition mode. If a mobile computing device is already in quick-paging recognition mode, 11 could be used to indicate the mobile computing device should listen to the paging-channel time segment in the next assigned primary time slot, and 01 could be used to indicate a transition to a tracking mode. To indicate a transition out of a tracking mode, 10 could be used. Those skilled in the art will recognize that there are many other ways quick-paging messages could be formatted.

Quick-paging messages could also use a form of redundancy. By way of example, turning to FIG. 5, the quick-paging messages could use full redundancy, having each bit replicated. A four-bit message 500 could be used to represent each command. The first two bits 501 could indicate the message and the last two bits 502 could contain a repetition of the message. There are other forms of error coding that could be used to help decode a quick-paging message in the presence of errors.

According to an embodiment of the invention, a computing device connected to a network of base stations could determine that a threshold period of time has elapsed since a mobile computing device has communicated a location-determining message. Without a location-determining message, the computing device may be unable to choose an appropriate base station to send messages destined to the mobile device through. The computing device can send a request to the mobile device for it to transition to a quick-paging recognition mode. FIG. 6 is a flow diagram depicting a method 600 of responding to such a request, and thereby facilitating a reduction in a latency associated with communicating with the mobile computing device. A response is sent, responding to the first request, indicating a transition to a quick-paging recognition mode, as shown at block 601. According to an embodiment of the invention, each mobile computing device can be configured to use a quick-paging recognition mode. Subsets of mobile computing devices that are taking long periods of time to respond to pages could be placed into quick-paging recognition mode to locate them more rapidly. The indication could be a short message, with or without redundancy, as discussed with reference to FIG. 5. The indication could be sent in a quick-paging channel segment of a slotted protocol, wherein when a mobile node is not in quick-paging recognition mode, it listens to both a quick-paging channel segment and a paging channel segment of a primary time slot.

The mobile computing device transitions to the quick-paging recognition mode, as shown at block 602. As discussed above, in the quick-paging recognition mode, the mobile device could only turn on its radio during a quick-paging channel time segment, which could be significantly shorter than a paging-channel time segment. The mobile device receives a second indication, indicating a paging-channel message will be sent, as shown at block 603. The second indication could be sent in a quick-paging channel segment of a slotted protocol and be formatted similarly to those messages discussed above. The mobile computing device acquires the paging-channel message by listening to a paging channel, as shown at block 604. For example, the mobile computing device could listen to the paging-channel segment in its next assigned primary slot.

The mobile computing device returns to a quick-paging recognition mode, as shown at block 605. By way of example, the mobile computing device could return to only having its radio on during the quick-paging channel segment of its associated primary time slots. Those skilled in the art will recognize that there are a number of other channel models and protocols suitable for the invention.

Turning now to FIG. 7, a flow diagram showing a method 700 of transitioning out of a quick-paging recognition mode is given. An indication is received, indicating a mobile computing device to transition out of a quick-paging mode, as shown at block 701. This indication could be sent over a slotted protocol in a quick-paging channel segment. A transition out of the quick-paging recognition mode is performed by the mobile computing device, as shown at block 702. By way of example, a transition out of a quick-paging mode could entail the mobile computing device listening to all segments of each of its assigned primary slots (e.g., the quick-paging channel segment and the paging channel segment).

Turning now to FIG. 8, a flow diagram showing a method 800 of locating a mobile computing device is given. An request, indicating a transition to a tracking mode is sent from a computing device attached to a network of base stations to a mobile device, as shown at block 801. The indication could be sent in the quick-paging channel segment of the primary slot associated with a mobile computing device. Those skilled in the art will recognize that there are a number of ways that a tracking mode could be implemented. By way of example, a mobile computing device could be configured to detect when it has moved between base stations, sectors, or carriers. Upon detecting a move, the mobile computing device could send a signal indicating the new location. Location can be defined as the point of attachment to a network, for example.

The mobile computing device transitions to a tracking mode, as shown at block 802. The mobile device transmits a location-change message in response to a change in location, as shown at block 803. The location-change message could be a short message indicating the identity of the mobile computing device. The location could then be determined by detecting which base station, sector, or carrier received the location-change message.

Turning now to FIG. 9, a flow diagram depicting a method 900 of transitioning out of a tracking mode is given. An indication indicating a transition out of a tracking mode should be performed is received, as shown at block 901. The indication could be received in a quick-paging channel segment of a primary slot associated with the mobile computing device. The indication could be formatted in a number of ways. For example, the indication could be a two-bit message with two-bits of redundancy. A transition out of tracking mode occurs, as shown at block 902. A mobile computing device could stop sending location-change messages due to a change in location as a result of transitioning out of a tracking mode.

Figure 10:
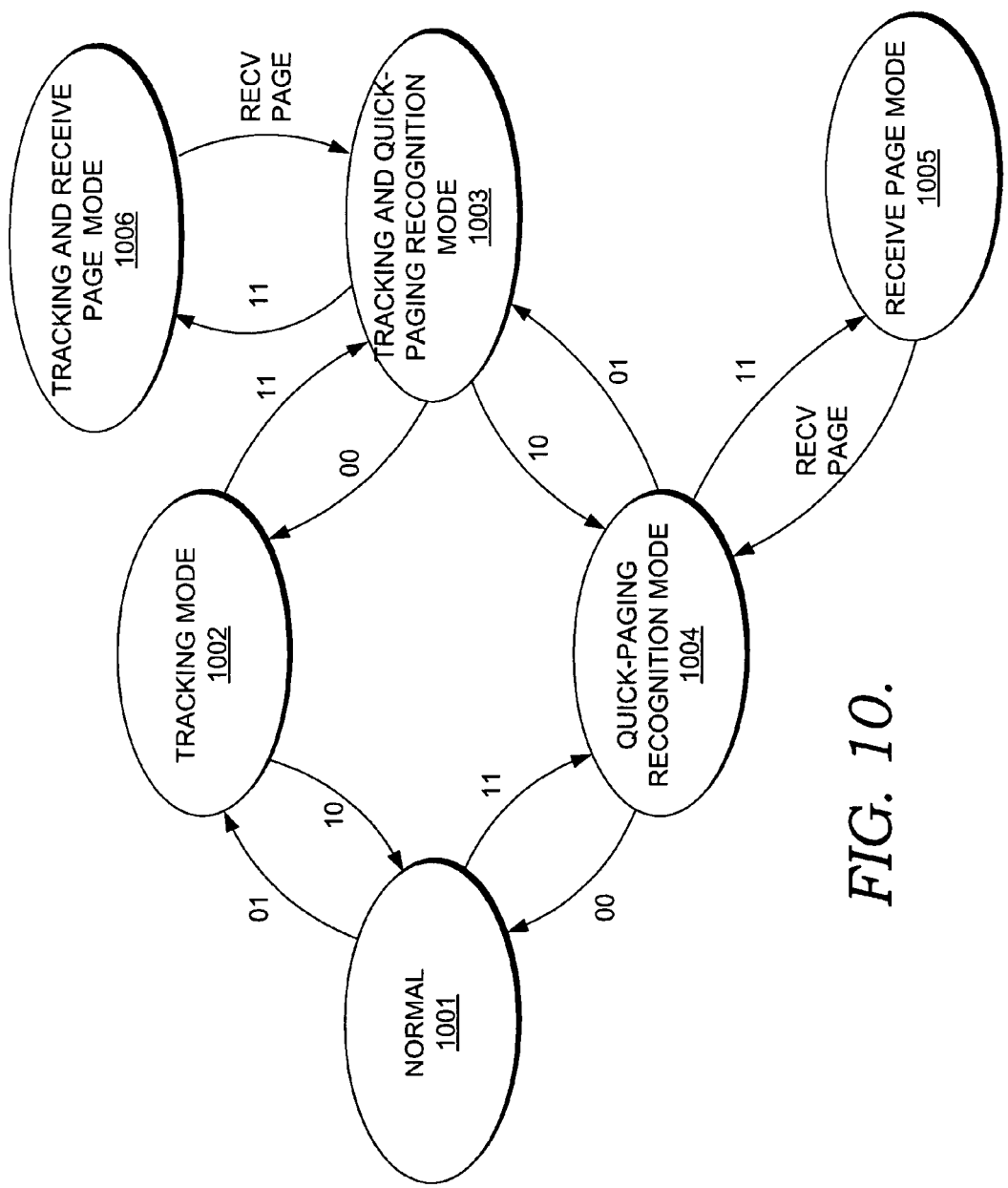
FIG. 10 is a state diagram depicting the state machine for a method of locating a mobile computing device in accordance with an embodiment of the present invention.

Turning now to FIG. 10, a state transition diagram for depicting a method for locating a mobile computing device utilizing a quick-paging channel is given. The state diagram has five states. The normal state 1001 indicates a state where a mobile computing device is not in either a quick-paging recognition mode or a tracking mode. In the normal mode, a mobile computing device may listen to both a quick-paging channel segment and a paging-channel segment of a primary slot associated with the mobile computing device. The tracking mode state 1002 indicates a state where the mobile computing device is in a tracking mode. In a tracking mode, a mobile computing device may send location-change messages as a result of changing a point of attachment to a network. The quick-paging recognition mode state 1004, indicates a mobile computing device is in a quick-paging recognition mode. In a quick-paging recognition mode, a mobile computing device may only listen to a quick-paging channel segment of its associated primary slot. In receive page mode state 1005, a mobile computing device may listen to a paging-channel slot of a primary slot associated to it. In tracking and quick-paging recognition mode state 1003, a mobile node can be in both quick-paging recognition mode and tracking mode at the same time. In tracking and receive page mode state 1006, a mobile computing device may listen to a paging-channel slot of a primary slot associated to it.

Many message formats could be used to effect transitions from one state to another state, including message formats with no error correcting code or redundancy, message formats with redundancy, and message formats with error correcting codes. By way of example, two-bit messages received in a quick-paging channel segment of a primary slot associated with a mobile computing device could be used to effect state transitions. 01 could be used to indicate a transition from normal state 1001 to tracking mode state 1002. 10 could be used to indicate a transition from tracking mode state 1002 to normal mode state 1001. 11 could be used to indicate a transition from tracking mode state 1002 to tracking and quick-paging recognition mode state 1003. 00 could be used to indicate a transition from tracking and quick-paging recognition mode state 1003 to tracking mode state 1002. 11 could be used to indicate a transition from normal state 1001 to quick-paging recognition mode state 1004. 00 could be used to indicate a transition from quick-paging recognition mode state 1004 to normal state 1001. 01 could be used to indicate a transition from quick-paging recognition state 1004 to tracking and quick-paging recognition mode state 1003. 10 could be used to indicate a transition from tracking and quick-paging recognition mode state 1003 to quick-paging recognition mode state 1004. 11 could be used to indicate a transition from quick-paging recognition mode state 1004 to receive page mode state 1005. Receiving a page message could indicate a transition from receive page mode state 1005 to quick-page recognition state 1004. 11 could be used to indicate a transition from tracking and quick-paging recognition mode state 1003 to tracking and receive page mode state 1006. Receiving a page message could indicate a transition from tracking receive page mode state 1006 to tracking and quick-paging recognition state 1003.

Turning now to FIG. 11, a flow diagram depicting a method 1100 of reducing the time for a computing device to deliver a message to a mobile computing device is given. A request to transition to a tracking mode is received, as shown at block 1101. The message to transition to a tracking mode can be received over a quick-paging channel. A transition to a tracking mode is performed, as shown at block 1102. A location-change message is send via a slotted access channel, as shown at block 1103. The message indicates that a mobile computing device has changed locations. By way of example, the mobile computing device could have move to a new sector in a wireless telecommunications network. A number of different formats could be used for the location-change message, as discussed with reference to FIG. 5. For example, 11 could be used to stand for new sector.

Turning now to FIG. 12, a flow diagram depicting a method 1200 of reducing the time for a computing device to deliver a message to a mobile computing device is given. A request to transition to a tracking mode is received, as shown at block 1201. A tracking-message acknowledgement is sent, as shown at block 1202. There are a number of formats appropriate for the acknowledgement. By way of example, 01 could be used to stand for a tracking-message acknowledgement. A transition to a tracking mode is performed, as shown at block 1203. A location-change message is sent via a slotted access channel, as shown at block 1204, similar to block 1103. A low-signal message is sent via a slotted access channel, as shown at block 1205. A mobile computing device could enter an area with poor signal quality. For example, the mobile computing device could move to a geographic area far from any base station, or an area with strong fading effects. The mobile computing device could then send a low-signal strength message to indicate that it may be unreachable. There are many suitable formats for a low-signal message. For example, a 10 stand for a low-signal quality. A low-battery message is sent via a slotted access channel, as shown at block 1206. A mobile computing device could detect a low remaining battery capacity, which might indicate that it could be unreachable. The mobile device could send a low-battery message to inform other devices on the network. There are many suitable formats for a low-battery message. By way of example, a 00 could stand for a low-battery state.

Figure 13:
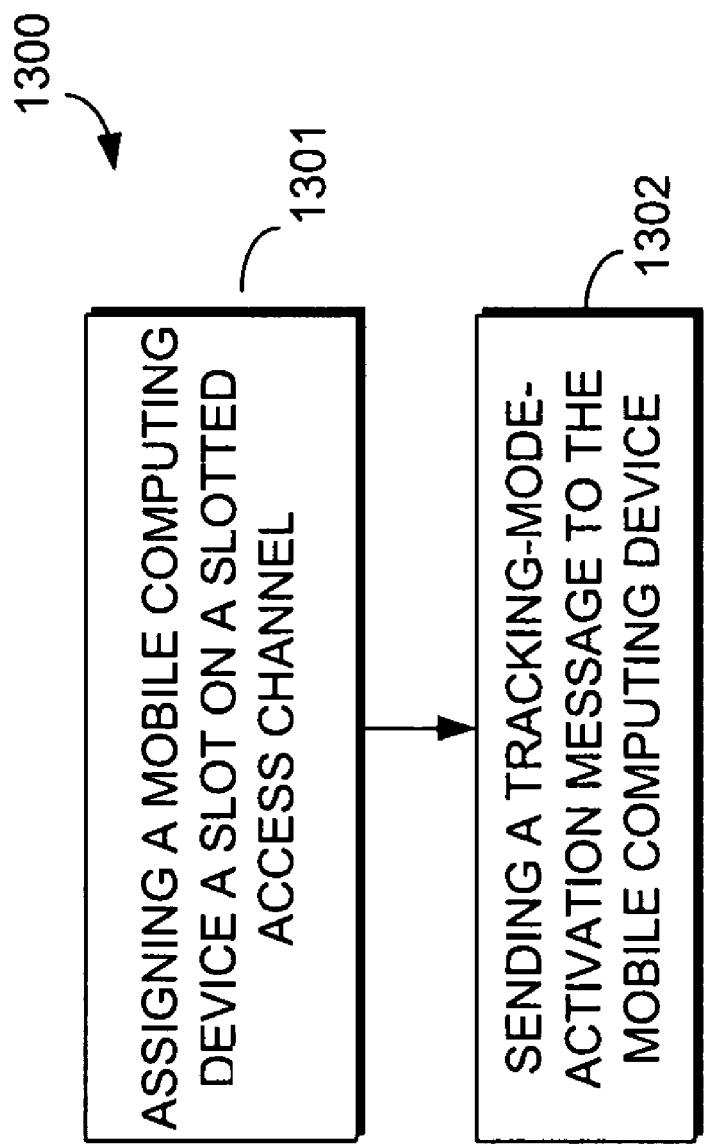
FIG. 13 is a follow diagram showing a method of reducing the time for a computing device to deliver a message to a mobile computing device, in accordance with an embodiment of the present invention.

Turning now to FIG. 13, a flow diagram depicting a method 1300 of reducing the time for a computing device to deliver a message to a mobile computing device is given. A slot on a slotted access channel is assigned to a mobile computing device, as shown at block 1301. There are a number of ways mobile computing devices could be assigned slots. By way of example, mobile computing devices could be dynamically assigned slots as they enter a sector. The slots could be assigned based on an identifier associated with the mobile computing device. A tracking-mode-activation message is sent to the mobile computing device, as shown at block 1302. The tracking-mode-activation message could be sent over the quick-paging channel, similar to that described with respect to FIG. 8. The tracking-mode-activation message could begin a method similar the methods depicted in FIG. 11 and FIG. 12.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-executable instructions embodied thereon that, when executed, enable a mobile computing device to perform a method of reducing the time for a computing device to deliver a message to the mobile computing device, the method comprising:
   at the mobile computing device, receiving a request to enter a tracking mode, said request received on a quick paging channel, wherein said request is responsive to a threshold period of time elapsing since the mobile computing device has communicated with a base station;
   incident to receiving said request, transitioning to a tracking mode; and
   via a slotted access channel, sending a location-change message that indicates that said mobile computing device has entered a new location, when said mobile computing device enters said new location.

2. The media of claim 1, wherein the location-change message includes a two-bit portion.

3. The media of claim 2, wherein the location-change message further includes two bits of redundancy.

4. The media of claim 1, wherein the mobile computing device is assigned a slot on the slotted access channel, thereby providing a slot assignment.

5. The media of claim 4, wherein the slot assignment is based on a mobile identifier.

6. The media of claim 4, wherein said slot on the slotted access channel is dynamically assigned.

7. The media of claim 1, further comprising dividing the slotted access channel into 2,400 four-bit slots each second.

8. The media of claim 1, wherein said new location includes a new sector, wherein said sector is coverage area in a wireless telecommunications network.

9. The media of claim 1 further comprising, via the slotted access channel, sending a low-signal message that indicates that said mobile computing device detects a poor signal quality, when said mobile computing device detects a poor signal quality.

10. The media of claim 1 further comprising, via the slotted access channel, sending a low-battery message that indicates that said mobile computing device detects a low remaining battery capacity, when said mobile computing device detects a low remaining battery capacity.

11. One or more nontransitory computer-readable media having computer-executable instructions embodied thereon that, when executed, enable a mobile computing device to perform a method of reducing the time for a computing device to deliver a message to the mobile computing device, the method comprising:
 at the mobile computing device, receiving a request to enter a tracking mode, said request received on a quick paging channel, wherein said request is responsive to a threshold period of time elapsing since the mobile computing device has communicated with a base station;
 via a slotted access channel, sending a tracking-message acknowledgement, the mobile computing device being assigned a slot on the slotted access channel;
 incident to receiving said request, transitioning to a tracking mode;
 via a slotted access channel, sending a location-change message that indicates that said mobile computing device has entered a new location, when said mobile computing device enters said new location;
 via the slotted access channel, sending a low-signal message that indicates that said mobile computing device detects a poor signal quality, when said mobile computing device detects a poor signal quality; and
 via the slotted access channel, sending a low-battery message that indicates that said mobile computing device detects a low remaining battery capacity, when said mobile computing device detects a low remaining battery capacity.

12. The media of claim 11, wherein the low-signal message includes a two-bit portion.

13. The media of claim 12, wherein the low-signal messages further includes two bits of redundancy.

14. The media of claim 11, wherein the low-battery message includes a two-bit portion.

15. The media of claim 14, wherein the low-battery message further includes two bits of redundancy.

16. One or more nontransitory computer-readable media having computer-executable instructions embodied thereon that, when executed, enable a computing device to perform a method of reducing the time to deliver a message to a mobile computing device, the method comprising:
 assigning the mobile computing device a slot on a slotted access channel by the computing device, each slot on said access channel being dynamically assigned based on a mobile identifier, identifying an associated mobile computing device;
 sending from the computing device a tracking-mode-activation message to the mobile computing device, responsive to a threshold period of time elapsing since the mobile computing device has communicated with a base station, wherein said mobile computing device is configured to perform a process incident to receiving said message, wherein said process includes,
 transitioning to a tracking mode, and
 via a slotted access channel, sending a location-change message that indicates that said mobile computing device has entered a new location, when said mobile computing device enters a new location.

17. The media of claim 16, wherein the threshold period of time is extended, responsive to the receipt at the computing device of a low-signal message from the mobile computing device, said low-signal message indicating that said mobile computing device has detected a poor signal quality.

18. The media of claim 17, wherein the low-signal message is received over a slotted access channel.

19. The media of claim 16, wherein the threshold period of time is extended, responsive to the receipt at the computing device of a low-battery message from the mobile computing device, said low-battery message indicating that said mobile computing device has detected a low remaining battery capacity.

20. The media of claim 19, wherein the low-battery message is received over a slotted access channel.

* * * * *